United States Patent

Briggs et al.

[11] 4,004,067
[45] Jan. 18, 1977

[54] RECHARGEABLE ELECTROCHEMICAL CELL

[75] Inventors: Donald C. Briggs, Mountain View; Ronald J. Haas, San Jose, both of Calif.

[73] Assignee: Aeronutronic Ford Corporation, Dearborn, Mich.

[22] Filed: June 7, 1976

[21] Appl. No.: 693,573

[52] U.S. Cl. .................................. 429/57; 429/101
[51] Int. Cl.² ....................................... H01M 10/34
[58] Field of Search ............... 429/101, 57, 59, 61, 429/63, 72, 17, 19, 25

[56] References Cited

UNITED STATES PATENTS

| | | | |
|---|---|---|---|
| 2,842,607 | 7/1958 | Germershansen et al. | 429/59 |
| 2,988,584 | 6/1961 | Peters | 429/59 |
| 3,565,691 | 2/1971 | Strier et al. | 429/25 |
| 3,669,744 | 6/1972 | Tsenter et al. | 429/101 |
| 3,867,199 | 2/1975 | Dunlop et al. | 429/59 X |

*Primary Examiner*—Anthony Skapars
*Attorney, Agent, or Firm*—William E. Johnson; Keith L. Zerschling

[57] ABSTRACT

A rechargeable electrochemical cell is disclosed which includes both a cathode and a gas generating and consuming anode housed within a closed container. A storage volume is provided within the container for storing the gas used by the cell. A capillary mat lining material is provided throughout the gas storage volume of the cell. This lining material is in liquid transfer contact with a separator and electrolyte storage material located between the electrodes of the cell. If any electrolyte (i.e. water) of the cell is vaporized into the gas storage volume, the electrolyte will condense on the lining material and be conducted back to the separator and electrolyte storage material positioned between the electrodes.

5 Claims, 1 Drawing Figure

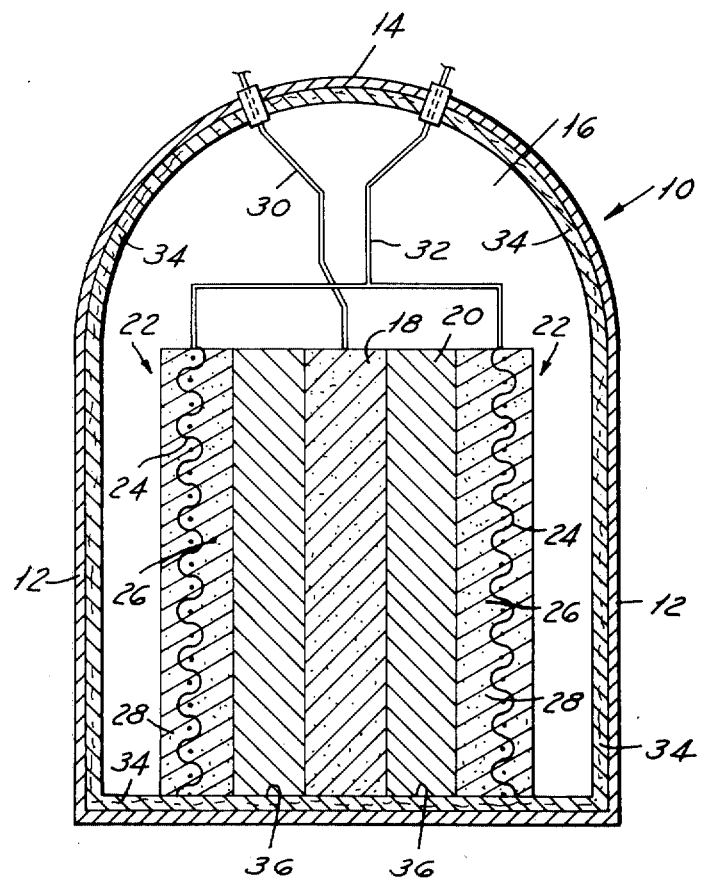

RECHARGEABLE ELECTROCHEMICAL CELL

BACKGROUND OF THE INVENTION

U.S. Pat. No. 3,565,691 issued on Feb. 23, 1971 for a "High Energy Density Silver Oxide-Hydrogen Battery" shows a battery formed of electrochemical cells which generate hydrogen upon charging thereof. This hydrogen is stored for use during discharge of the battery. Basically each cell of this battery consists of a silver cathode which is oxidized during charging, a gas generating and consuming anode which generates hydrogen during charging, and a separator and electrolyte storage material between the anode and the cathode which stores an aqueous electrolyte for each cell. The hydrogen generated during charging of each cell is stored in an open volume of the battery. The gas pressure of the open volume of the battery is an indication of the total charge of the battery. When the battery is discharged, hydrogen is consumed at the anode of each cell and the silver oxide cathode of each cell is reduced to silver. During the discharge cycle of the battery, the pressure of the open gas storage volume of the battery decreases. The battery may be alternately charged and discharged over its period of useful life.

One application for use of such a silver hydrogen battery is in a space vehicle. In space applications, however, the battery is not subjected to normal gravitational forces. Under such conditions, electrolyte contained in the separator and electrolyte storage material positioned between the electrodes of each battery cell can vaporize into the gas storage volume. This vaporized material (such as water) generally condenses on the container walls defining the storage volume. Once the material is condensed on these walls, it is of course lost for future use as an electrolyte. The loss of electrolyte from the system reduces the total amount of hydrogen generating and cathode oxidizing electrolyte component and thereby reduces the level to which the battery may be charged on a charging cycle. This action, in turn, reduces the total amount of energy which may be withdrawn from the battery during a discharge thereof.

It is an object of this invention to provide an improved rechargeable electrochemical cell for a battery which eliminates the reduction of battery capacity because of electrolyte loss.

It is another object of this invention to provide an improved rechargeable electrochemical cell for a battery which employs simple, reliable, structure for reducing the loss of battery capacity because of electrolyte loss.

SUMMARY OF THE INVENTION

This invention relates to a rechargeable electrochemical cell for a battery and, more particularly, to such a rechargeable electrochemical cell for a battery in which a reduction of the capacity of the battery is eliminated because of the loss of electrolyte from operative portions of the battery.

In accordance with the teachings of this invention, a rechargeable electrochemical cell for a battery includes a closed container confining therewithin at least a cathode, a gas generating and consuming anode, a separator and electrolyte storage material between the cathode and the anode, an electrolyte in the separator and electrolyte storage material, and an open volume for gas storage. The cell improvement comprises lining the inside surface of the closed container defining the open volume for gas storage with a layer of a capillary mat material. The lining of the capillary mat material has at least a portion thereof in liquid transfer contact with the separator and electrolyte storage material located between the cathode and the anode. Any electrolyte of the cell vaporized into the gas storage volume will condense onto the capillary mat lining material. The liquid transfer contact of the capillary mat lining material and the separator and electrolyte storage material provides a liquid flow path for returning vaporized and subsequently condensed electrolyte to a storage location between the electrodes.

In accordance with further teachings of this invention, if desired, the capillary mat material lining the closed container and the separator and electrolyte storage material between the electrodes of the cell may be made of the same material. Also, if desired, the capillary mat lining material may have a thickness substantially less than that of the material separating the electrodes so that the greatest volume of electrolyte is stored between the electrodes.

BRIEF DESCRIPTION OF THE DRAWING

The drawing depicts schematically a rechargeable electrochemical cell for a battery system.

DESCRIPTION OF THE PREFERRED EMBODIMENT

In the drawing there is shown a single, rechargeable electrochemical cell, generally identified by the numeral 10. This cell may be used by itself, or grouped with other cells to form a battery. In particular, the cell of the preferred embodiment is a silver-hydrogen type discussed generally in the aforementioned U.S. Pat. No. 3,565,691. The cell may also be of a construction such as taught in U.S. patent application Ser. No. 492,406, filed Aug. 29, 1974 for a "Rechargeable Silver-Hydrogen Battery", which application is assigned to the same assignee as this application and is hereby incorporated by reference.

In accordance with a preferred construction for the electrochemical cell 10, a container 12 is provided. This container is formed from a high strength material such as type 718 A Inconal so that it resists high pressures of hydrogen when that gas is generated internally of the cell as will be discussed in a later portion of this specification. The container is cylindrical in cross section at its lower portion and is provided with a domed upper portion 14 which encloses a gas storage volume 16.

A silver cathode 18 is provided which has a circular cross section. When the cell of the battery is charged, the silver cathode acts as an anode and is oxidized to silver oxide. Upon discharge, the silver cathode acts as a cathode and the silver oxide is reduced to silver. This silver cathode may be formed by pressing silver powder, e.g., Handy and Harman SIL Powder 130 in a mold to 2500 psi and sintering at 625° F for 5 minutes. In this manner the silver cathode is porous and it has a very high surface area per unit volume.

Encircling the silver cathode 18 is a separator and electrolyte storage material 20. In the preferred embodiment, the separator and electrolyte storage material has a ring-shaped cross section. This material may be made of a non-woven nylon such as the material sold under the tradename Pellon-2505 by Pellon Corporation at 221 Jackson Street, Lowel, Mass. 01852. This material may also be made of a fuel cell grade abestos such as sold by the Johns-Manville Company of Greenwood Plaza, Denver, Colo. 80217. The material serves two basic functions. The first function is that the material stores the aqueous electrolyte, in this case a 30% solution of potassium hydroxide, in open pores of the material so that the electrolyte is available during the charge and discharge of the cell to carry out its chemical function. The second purpose of this material is to serve as a medium for conducting the electrolyte from one area of the cell to another along with the ions to be transferred from one electrode to another. Since this material is continuous in nature, the concentration of electrolyte in one zone will be equal to the concentration of electrolyte in another zone thereof. If any disruption of the concentration takes place in a particular zone, electrolyte will be transferred to the zone of reduced electrolyte by the capillary nature of the pore structure of the material. Thus the concentration of electrolyte is balanced throughout the cell by use of this separator and electrolyte storage material.

On the outside of the separator and electrolyte storage material 20 is found a gas generating and consuming anode, generally identified by the numeral 22. This anode, in its preferred embodiment, has a ring-shape cross section. This anode is described more fully in the mentioned application Ser. No. 492,406. This anode may be manufactured by coating a forty mesh nickel screen 24 on one side with a liquid semipermeable catalytic mixture 26 containing platinum black which is the catalyst. The other side is coated with porous Telflon 28, the pores of which are made sufficiently large to render the layer easily permeable to gaseous hydrogen but small enough to be impermeable to the electrolyte contained in the separator and electrolyte storage material 20. Since Telflon is not wet by water, the coating is waterproof and hydrophobic. The active platinum black of the catalytic mixture 26 is held by a Telflon binder and is also made sufficiently porous to be permeable to hydrogen gas but semi-impermeable to the electrolyte. Thus by virtue of the anode construction, during discharges of the cell, gaseous hydrogen will contact the electrolyte at the catalytic interface that, in turn, promotes ionization of the hydrogen so that it enters into the cell reaction.

An electrical lead 30 is connected to the silver cathode 18 while an electrical lead 32 is connected to the gas generating and consuming anode 22. These electrical leads are used during charging and discharging of the cell of the battery for the purpose of conducting electrons between the electrodes. During battery charge, the silver cathode is oxidized to silver oxide while hydrogen gas is produced at the gas generating and consuming anode 22. The hydrogen gas fills the gas storage volume 16, thereby building up a gas pressure in this volume. Upon full charge of the battery, the maximum gas pressure will be found in the gas storage volume. The oxygen for oxidizing the silver electrode comes from the water of the aqueous solution. Thus the concentration of the water in the aqueous solution is reduced during the charging of the battery, the amount of reduction being determined by the charge built up in the cell. Upon discharge of the cell of the battery, hydrogen is consumed at the gas generating and consuming anode 22 and the silver oxide of the silver cathode 18 is reduced to silver. In space applications, the cell 10 may be charged through such a device as a solar cell array illuminated by the sun.

In accordance with the teachings of this invention, the inside surface of the closed container 12, particularly the domed upper portion 14 thereof defining the gas storage volume 16, is lined with a layer of a capillary mat material 34. This material is preferably formed from a non-woven nylon such as the Pellon 2505 previously mentioned. In the construction of an actual cell, this lining would have a thickness in the range of from 0.002–0.005 inches whereas the separator and the electrolyte storage material 20 would have a thickness in the range from 0.01–0.03 inches in thickness.

The capillary mat material 34 and the separator and electrolyte storage material 20 may be one and the same material or they may be different materials. If they are the same material, the concentration per unit volume of electrolyte throughout the material generally will be the same. If the materials are different, the concentration of electrolyte in each material will be substantially uniform throughout the material but may be different than what is found in the other material depending upon the exact physical makeup of each material. The principal function of both these materials are electrolyte storage, with the separator and electrolyte storage material 20 being of greater mass and, therefore, storing the bulk of the electrolyte of the cell.

The purpose of lining the entire gas storage volume of the cell with the capillary mat material 34, is that although the gas generating and consuming anode 22 is generally impervious to the passage of electrolyte therethrough, some of the material does pass therethrough and becomes a vapor in the gas storage volume 16. This is particularly true in space applications where the forces of gravity are not present to retard the passage of the vapors through the gas generating and consuming anode 22. Without the capillary mat material 34 as a lining, the vapors are free to condense against the outer surface of the container 12 and are thereafter lost for future use in the battery. The loss of the electrolyte reduces the potential charge which may be stored in the battery, and as sufficient electrolyte becomes condensed in the storage volume of the container, other problems such as overdischarge generation of hydrogen and oxygen gas at the anode and the cathode respectively leading to a potential explosive mixture of gas in the presence of the anode catalyst can arise. In accordance with the preferred teachings of this invention, the capillary mat material 34 is provided as a lining throughout the interior surface of the container 12. The lining material, in any event, has at least a portion thereof which is continuous from the domed upper portion 14 of the container 12 down the side walls of the container and across the bottom wall thereof to a position of liquid transfer contact 36 with the separator and electrolyte storage material 20. By establishing such a liquid transfer contact, any material which is vaporized into the gas storage volume 16 and subsequently condensed on the lining material, will have a capillary path for being conducted back to the separator and electrolyte storage material.

The reason that at least an equivalent volume of the electrolyte is conducted back to the separator and electrolyte storage material 20 is that the condensation of electrolyte in a small zone of the lining material 34 will set up a concentration gradient which produces flow through the capillary mat because the entire mat desires to be at a uniform concentration. The concentration gradient therefore results in a mass transfer of electrolyte and eventually an equilibrium state is once again achieved in the battery cell in which proper amounts of electrolyte are contained in both the separator and the electrolyte storage material 20 and the capillary mat lining material 34. The reason for making the capillary mat material substantially thinner than the storage material is that this insures that under equilibrium conditions the substantial portion of the electrolyte is contained in the separator and the electrolyte storage material so that it is available to carry out its intended function during charging and discharging of the cell.

There has been disclosed herein a rechargeable electrochemical cell providing a sturcture which insures that electrolyte is not lost from operative association with the electrodes of the cell over the cell's useful life. In view of the teachings of this specification, those skilled in the art will be able to develop modifications of this cell structure which fall within the true spirit and scope of this invention. It is intended that all such modifications be included within the scope of the appended claims.

What we claim is:

1. In a rechargeable electrochemical cell including a closed container confining therewithin at least a cathode, a gas generating and consuming anode, a separator and electrolyte storage material between the cathode and the anode, an electrolyte in the storage material and an open volume for gas storage, the improvement which comprises:

lining the inside surface of the closed container defining the open volume for gas storage with a layer of a capillary mat material, said lining of said capillary mat material having at least a portion thereof in liquid transfer contact with the separator and electrolyte storage material located between the cathode and the anode, whereby any electrolyte vaporized into the gas storage volume will condense onto said lining material, and whereby the liquid transfer contact of said lining material and the separator and electrolyte storage material between the cathode and the anode will provide a liquid flow path for returning vaporized and subsequently condensed electrolyte to the separator and electrolyte storage material between the cathode and the anode.

2. The improved electrochemical cell of claim 1 wherein: said capillary mat material forming said lining material is relatively thin with respect to the separator and electrolyte storage material located between the cathode and the anode whereby the bulk of the volume of the electrolyte is stored between the cathode and the anode.

3. The improved electrochemical cell of claim 2 wherein: said lining material is no more than about one-half the thickness of the separator and electrolyte storage material between the cathode and the anode.

4. The improved electrochemical cell of claim 1 wherein: said lining material and the separator and electrolyte storage material are formed of the same material.

5. The improved electrochemical cell of claim 4 wherein: the material forming said lining material and the separator is a non-woven nylon material.

* * * * *